Jan. 21, 1969     A. V. SOMERS     3,423,216
METHOD OF MAKING A CERAMIC CORE
Filed Oct. 23, 1965
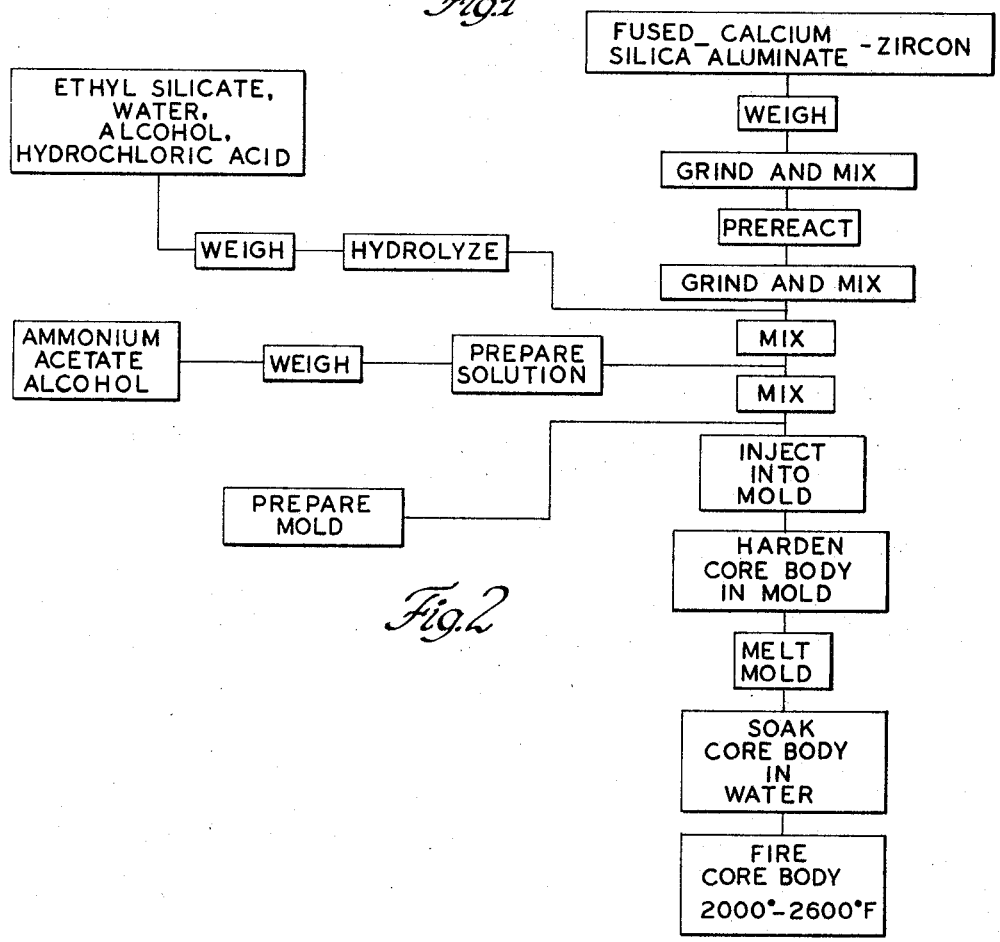
INVENTOR.
Arthur V. Somers
BY
Peter P. Kozak
ATTORNEY United States Patent Office 3,423,216
Patented Jan. 21, 1969

3,423,216
METHOD OF MAKING A CERAMIC CORE
Arthur V. Somers, Flushing, Mich., assignor to General Motors Corporation, Detroit, Mich., a corporation of Delaware
Filed Oct. 23, 1965, Ser. No. 503,123
U.S. Cl. 106—38.35
Int. Cl. C04b 35/14
7 Claims

ABSTRACT OF THE DISCLOSURE

A method is disclosed for preparing ceramic molding materials for molding leachable ceramic cores. Leachable ceramic cores are useful in precision investment casting. In a preferred embodiment ceramic components comprising fused silica and calcium aluminate are prereacted at an elevated temperature to eliminate the hydraulic reaction of the calcium aluminate. This prereaction prevents over rapid curing when a binder solution of hydrolyzed ethyl silicate and ammonium acetate is mixed with the ceramic materials. As a result the moldable mixture is fluid and readily introduced into a mold defining an intricate core body.

---

This invention relates to leachable ceramic cores and to ceramic based core molding compositions for investment castings and more particularly to an improved method of preparing such cores.

It is an object of this invention to provide leachable ceramic core bodies for precision investment casting.

It is a further object of this invention to provide an improved method and ceramic based composition for forming leachable ceramic cores. It is a more specific object to provide a method of preparing a fused silica based mixture for injecting into a suitable core mold which has the advantages of having a long useful shelf life, requiring a minimum amount of binder liquid and having excellent flow properties.

In accordance with my invention these and other objects and advantages are accomplished by reacting a mixture of 80 to 95 parts by weight fused silica, 5 to 20 parts by weight calcium aluminate, and, if desired, 5 to 10 parts by weight zircon at an elevated temperature, preferably 2000° F. to 2200° F., for a period of 30 to 60 minutes, and subsequently cooling the mixture to room temperature. The purpose of this high temperature reaction is to eliminate the hydraulic reaction of the calcium aluminate and to neutralize its alkaline activity in water whereby a readily moldable material is obtained if a binder system containing water or alcohol is added to the prereacted ceramic mixture.

A binder system of hydrolyzed ethyl silicate activated with ammonium acetate is used to cure or harden the mixture. First, an alcohol and water solution of hydrolyzed ethyl silicate is added to the reacted ceramic mixture. Subsequently an alcohol solution of ammonium acetate is added to the mixture and thoroughly mixed with it to form a core molding mixture. This mixture is then immediately injected into a suitable mold at room temperature. After hardening in the mold for at least one hour, the mold is removed and the hardened self-sustaining core is fired at a suitable temperature. After firing the finished core is ready for use in precision casting.

Other objects will become apparent to one skilled in the art from the detailed description which follows, reference being had to the drawings wherein;

FIGURE 1 is a perspective view of a typical core body for use in the precision investment casting of a turbine blade, and FIGURE 2 is a flow diagram depicting the subject process.

Fused silica is well known as a core material for casting refractory metals. This is because it maintains sufficient strength at casting temperatures and may be removed after casting from within the cast article by leaching with molten potassium hydroxide. Fused silica is prepared by fusing ordinary silicon dioxide and subsequently cooling and grinding it to a powder. However, under the proper conditions of time and temperature amorphous fused silica will convert to a crystalline form, cristobalite. The processing times and temperatures involved in the production of silica cores and during their use in the casting process approximates these conditions. Since the coefficient of thermal expansion of cristobalite is approximately 19 times that of fused silica, it is apparent that this phase transformation is to be avoided if possible. Should crystallization occur, significant and unacceptable dimensional changes will take place in the core body. The success of precision investment casting depends in no small amount upon the dimensional stability of core and mold bodies. A core body which warps, or is otherwise distorted during casting operations has no utility in such a process. If the economies of a silica based core composition are to be successfully exploited, crystallization must be prevented.

It is known that the addition of calcium aluminate, barium aluminate, or strontium aluminate, effectively retards crystallization of fused silica under casting conditions. Calcium aluminate is usually preferred because of cost. However, barium and strontium aluminate are equally operable. In the following description reference will be made to calcium aluminate with the understanding that barium or strontium aluminate could be substituted. Magnesium aluminate is not effective. The use of these aluminates in minor amounts preferably 5% to 20% by weight of a mixture with fused silica, will form a satisfactory dimensionally stable core body material. Core bodies so produced are much less temperature sensitive and may be fired to higher temperatures during production of the cores and may be used at higher metal casting temperatures than cores containing no calcium, barium or strontium aluminate.

It is known that the reaction of calcium aluminate with water and certain liquid alcohols may be used to cement together particles of fused silica. However, in accordance with my invention the function of calcium aluminate is to retard crystallization of the fused silica. The reactivity of the aluminates with water or alcohols is actually detrimental in the practice of my process. Rather than calcium aluminate and water, the binder system that I employ is hydrolyzed ethyl silicate together with a gelling agent, ammonium acetate.

The use of the ethyl silicate-ammonium acetate binder system is particularly advantageous in that the fused silica-calcium aluminate core material can be injected into a suitable mold under moderate pressures and will cure or harden at room temperature within an hour or so. However, because of the hydraulic reaction of calcium aluminate, I have found it undesirable to simply mix fused silica with calcium aluminate and other ceramic materials and then immediately incorporate the binder system. From the standpoint of production operations, this has several disadvantages. In the first place, the resulting mixture is extremely fast setting; in the order of one minute. This is not enough time to inject it properly into the mold. In addition, the mixture has poor handling and flow characteristics.

I have found that if the ceramic materials are mixed and then prereacted at a temperature of about 2000° F. to about 2200° F. for 30 to 60 minutes and subsequently cooled to room temperature prior to the addition of hydrolyzed ethyl silicate significant advantages are realized. In accordance with my invention, this highly beneficial prereaction step is critical. As a consequence, a longer useful shelf life, upwards of 20 minutes to ½ hour, is obtained; less ethyl silicate solution is required; and vastly improved flow properties are realized. Thus, there is less tendency for the final mixture to form cracks or warp during subsequent processing steps involving the formulation of cores.

It would appear that the effect of the heating at elevated temperatures is to react the aluminates with the fused silica to form a chemical species which is less affected by the water and alcohol in the binder system. That the calcium aluminate is chemically changed by heating in the presence of fused silica at high temperatures is born out by the fact that the alkalinity of the ceramic mixture is greatly reduced by this treatment. For example, a sample of an unreacted mixture of 80 to 95% by weight fused silica and 5 to 20% by weight calcium aluminate when stirred in an equal weight, or less, of distilled water will display a pH of at least 11. At the conclusion of the prereaction a sample similarly prepared should have a pH of 6–7. This reduction in pH is the measure of completeness of the ceramic prereaction. It indicates that the mixture is no longer alkaline in nature and that the hydraulic reactivity of the calcium aluminate has been eliminated. This prereaction or pretreatment step is a time-temperature phenomenon. Thus, one skilled in the art would realize that similar results could be obtained below 2000° F. if sufficient time is allowed. Similarly, temperatures over 2200° F. could be used, but little advantage is gained. The important factor is the reduction in basicity of the ceramic mixture to a pH, as measured in a slurry in distilled water, of 6–7.

In accordance with my invention fused silica and various additives are mixed and milled to form a uniform mixture of desired particle size. This particle size will, of course, vary from application to application, but preferably should pass at least a #200 mesh screen. A ceramic core body composition which I have found to have highly desirable properties of dimensional stability and core strength may be obtained by mixing 80 to 95 parts by weight fused silica, 5 to 20 parts by weight calcium aluminate, and up to 10 parts by weight zircon and charging this mixture to a ball mill of suitable capacity. Zircon is a ceramic material which enhances the thermal and structural core properties of the silica and calcium aluminate. The mixture is milled until it is uniform in composition and until all of the constituents will pass a #200 screen. A specific example of a suitable core body material comprises 87½% by weight fused silica, 6.25% by weight zircon and 6.25% by weight calcium aluminate.

These materials were mixed and ball milled for eight hours at 38 r.p.m. using one inch alumina balls. After milling, the material was placed in a kiln and heated to 2200° F. with a one-half hour hold at temperature. The hot mixture was recooled to room temperature and reground in the ball mill. This prereacting treatment eliminated the hydraulic reaction of calcium aluminate and the pH shift in the alkaline direction of the mixture which makes gelling of the ethyl silicate difficult to control. The pH of a slurry of this material in distilled water was in the range of 6–7.

The rate of cooling of the hot reacted ceramic mixture is not critical. It is usually necessary to return the cooled reacted material to a suitable ball mill or the like and regrind for about an hour to break up any lumps and to assure a uniform mixture.

As mentioned above, a binder system for the ceramic materials is used which comprises hydrolyzed ethyl silicate and ammonium acetate. The ammonium acetate is added to gell or activate the hydrolyzed ethyl silicate. Ethyl silicate is readily hydrolyzed in the presence of a dilute acid, such as dilute hydrochloric acid. Upon hydrolysis a colloidal solution of silicic acid is formed which can be deposited as a film on porous material such as the above ceramic particles to act as a binder. Upon heating to an elevated temperature, such as the firing of a molded core body, the salicic acid is dehydrated to silica. In the subject process, ammonium acetate is added to cause the colloidal silicic acid to gell and more effectively bind or cure the molding material.

Normally a solution of ethyl silicate and hydrochloric acid in alcohol and water is prepared in advance of molding operations. In this environment ethyl silicate is hydrolyzed in about two hours. The shelf life of the hydrolyzed material is short, one to two weeks, but can readily be extended by refrigeration. An alcohol solution of the gelling agent, is usually prepared separately and not added to the colloidal silicic acid until the hydrolyzed material has been thoroughly mixed with the prereacted ceramic composition. A solution of hydrolyzed ethyl silicate for use in this process preferably is prepared in the following manner. By weight 0.6 part of 37% hydrochloric acid is added to 4.9 parts of water. To this aqueous acid solution is added 44.5 parts ethyl alcohol. Finally 50 parts ethyl silicate is added to form what shall be considered for the purposes of this specification a 50% solution of hydrolyzed ethyl silicate. I have found that 16 to 64 parts by weight of such a solution may be used per 100 parts of prereacted ceramic mixture. Since hydrolyzed ethyl silicate could readily be prepared in concentrations other than a 50% solution the operable range of hydrolyzed ethyl silicate addition could be stated on a solvent-free basis as 8 to 32 parts solvent-free hydrolyzed ethyl silicate per 100 parts ceramic mixture.

For the specific ceramic composition mentioned above, comprised of fused silica, calcium aluminate, and zircon, 31.8 parts of the 50% ethyl silicate solution are preferred.

Ammonium acetate is added in an amount of about 0.12 to 0.50 part by weight per 100 parts of ceramic mixture on a solvent-free basis. It is conveniently added as a 17% by weight solution in ethyl alcohol.

The hydrolyzed ethyl silicate solution is thoroughly mixed with the prereacted ceramic material before ammonium acetate is added. To 100 parts of the aforementioned fused silica, calcium aluminate, and zircon mixture, now thoroughly mixed with 31.8 parts of the hydrolyzed ethyl silicate solution, was added 0.25 part by weight ammonium acetate dissolved in 1.25 parts by weight ethyl alcohol.

The resulting mixture was then injected into a suitable core mold at room temperature. After standing for at least one hour at room temperature, the core had cured or hardened to the point at which the mold could be removed and the core could be handled in the normal manner preliminary to firing.

A mixture of pretreated ceramic materials and ethyl silicate and ammonium acetate solutions prepared in accordance with my invention has excellent flow properties and can readily be injected into a suitable mold. The core body, after firing, is suitable for use in the casting of refractable materials, as for example, nickel-based alloys for turbine blades, and after casting can readily be leached from the metal by using molten potassium hydroxide.

In the case of the intricate and complicated core bodies for turbine blades, an example of which is illustrated in FIGURE 1, it is preferable to use a mold of special composition. As the cured core body must be separated from the mold without damaging its fine structure, it is desirable to use an expendable mold of low melting metal, whereby the mold containing the cured core body, may be lowered into boiling water and melted away from the core body.

An alloy suitable for use to form such a mold consists, by weight, of 50% bismuth, 26.7% lead, 13.3% tin, and 10% cadmium. A suitable mold can be formed from this material by die casting. As the metal is somewhat soft, it may be necessary to use a strong metal backup for the mold during the injection step.

After the injection and curing of the molding material, the core bodies and molds are placed in wire baskets and lowered into boiling water. Five to ten percent alcohol in the water aids in the clean separation of mold metal and core. After the metal has been removed, the cores are transferred to a tank of cold water and allowed to stand overnight. This step is critical in that it removes most of the alcohol which helps to control warpage.

Subsequently the cores are removed from the water and buried in wet silica grain in refractory trays. This gives the parts uniform support and allows uniform heating to aid in controlling warpage.

Preferably the cores are placed in a cold furnace for firing and the temperature raised as rapidly as the furnace will permit. The cores are held one hour at temperature, 2000–2600° F.

Cooling rates are not critical and parts may be cooled with the furnace or air cooled.

The product of this process is a precision finely structured core body which has excellent structural and thermal properties for use in the investment casting of high melting metals.

As mentioned above, either barium aluminate or strontium aluminate may be substituted for calcium aluminate to retard crystallization of the fused silica. Calcium aluminate is preferred because of its lower cost.

Furthermore, the advantageous results of my reaction treatment are obtainable with ceramic compositions other than the preferred combination of fused silica, calcium aluminate, and zircon. Other ceramic materials may be substituted for zircon in combination with the fused silica and a suitable aluminate. Thus, while my invention has been described in terms of a certain preferred embodiment, it is to be understood that other applications would be apparent to those skilled in the art and are within the scope of the invention as defined by the following claims.

I claim:

1. A method of preparing a ceramic molding mixture for molding leachable ceramic cores for precision investment casting comprising the steps of prereacting 100 parts by weight of a mixture comprised of 80 to 95 parts by weight fused silica, and 5 to 20 parts by weight of a basic aluminate taken from the group consisting of calcium aluminate, barium aluminate, and strontium aluminate at an elevated temperature of about 2000° F. to eliminate the hydraulic reaction of said basic aluminate and to neutralize the alkaline activity in water of said basic aluminate; air cooling said mixture to room temperature; and adding a binder system comprised of 8 to 32 parts by weight hydrolyzed ethyl silicate on a solvent-free basis and 0.12 to 0.50 part by weight ammonium acetate on a solvent-free basis to said prereacted ceramic mixture.

2. A method as in claim 1 wherein said prereaction is conducted by heating said mixture at a temperature in the range of about 2000°–2200° F. for a period of up to one hour.

3. A method as in claim 1 wherein said ceramic mixture is comprised of 80 to 90 parts by weight fused silica; 5 to 10 parts by weight of a basic aluminate taken from the group consisting of calcium aluminate, barium aluminate, and strontium aluminate; and 5 to 10 parts by weight zircon.

4. A method as in claim 3 wherein said ceramic mixture is prereacted by heating at a temperature in the range of about 2000°–2200° F. for a period of up to one hour.

5. A ceramic based molding composition for preparing leachable ceramic cores for precision investment casting comprised of the particulate reaction product obtained by firing 80 to 95 parts by weight fused silica and 5 to 20 parts by weight of a basic aluminate taken from the group consisting of calcium aluminate, barium aluminate, and strontium aluminate at a temperature of about 2,000° F.; 8 to 32 parts by weight hydrolyzed ethyl silicate on a solvent-free basis; and 0.12 to 0.5 part by weight ammonium acetate on a solvent-free basis.

6. A ceramic based molding composition for preparing leachable ceramic cores for precision investment casting comprised of the particulate reaction product obtained by firing 80 to 90 parts by weight fused silica, 5 to 10 parts by weight zircon, and 5 to 10 parts by weight of a basic aluminate taken from the group consisting of calcium aluminate, barium aluminate, and strontium aluminate at a temperature of about 2,000° F.; 8 to 32 parts by weight hydrolyzed ethyl silicate on a solvent-free basis; and 0.12 to 0.5 part by weight ammonium acetate on a solvent-free basis.

7. A ceramic based molding composition for preparing leachable ceramic cores for precision investment casting comprised of the particulate reaction product obtained by firing 87.5 parts by weight fused silica, 6.25 parts by weight calcium aluminate and 6.25 parts by weight zircon at a temperature of about 2,000° F.; 16 parts by weight hydrolyzed ethyl silicate on a solvent-free basis; and 0.25 part by weight ammonium acetate on a solvent-free basis.

References Cited

UNITED STATES PATENTS

| | | | |
|---|---|---|---|
| 2,911,311 | 11/1959 | Feagin et al. | 106—38.9 |
| 2,928,749 | 3/1960 | Watts | 106—38.3 |
| 2,948,032 | 8/1960 | Reuter | 106—38.3 XR |
| 3,017,677 | 1/1962 | Greenewald | 106—38.3 XR |
| 3,253,936 | 5/1966 | Weindel | 106—104 XR |
| 3,314,117 | 4/1967 | Fischman et al. | 108—38.3 XR |

FOREIGN PATENTS 738,981   10/1955   Great Britain.

JULIUS FROME, *Primary Examiner.*

L. HAYES, *Assistant Examiner.*

U.S. Cl. X.R.

106—38.3, 57, 63, 69